(No Model.) 2 Sheets—Sheet 1.
C. F. BRUSH.
SECONDARY BATTERY.
No. 266,090. Patented Oct. 17, 1882.
*Case. C.*
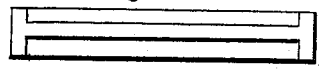
Fig. 1. Fig. 2. Fig. 4.
Fig. 3.
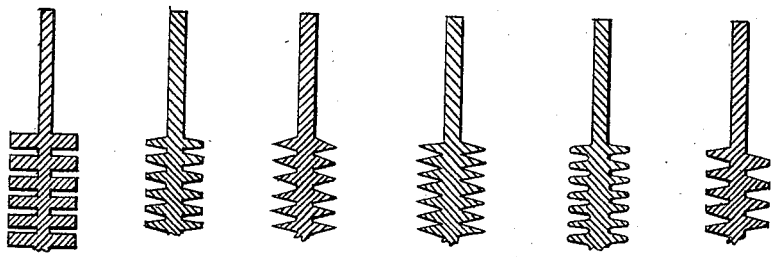
WITNESSES
W. Engel
W. C. Donnelly
Charles F. Brush, INVENTOR
By Leggett & Leggett
ATTORNEYS (No Model.)  2 Sheets—Sheet 2.

C. F. BRUSH.
SECONDARY BATTERY.

No. 266,090.  Patented Oct. 17, 1882.

=Case C.=

WITNESSES
Ernest O. Orsburn
Jno. Crowell Jr

Charles F. Brush  INVENTOR
By Liggett & Liggett
ATTORNEYS

UNITED STATES PATENT OFFICE.

CHARLES F. BRUSH, OF CLEVELAND, OHIO.

SECONDARY BATTERY.

SPECIFICATION forming part of Letters Patent No. 266,090, dated October 17, 1882.

Application filed June 9, 1881. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use it, reference being had to the accompanying drawings, which form part of this specification.

My invention relates to secondary batteries or apparatus for the absorption of electrical energy and subsequent exhibition of the same; and it consists in a secondary-battery plate or element having cells, receptacles, ribs, or projections on its surface, whereby an extended surface of metal is exposed to action, and other advantages, specified hereinafter, are secured; also, in constructing such secondary-battery elements of cast-lead, whereby construction is simplified and the subsequent process of "forming" greatly facilitated.

In the drawings, Figure 1 shows in end section a ribbed plate constructed according to my invention. Fig. 2 is a side view of the same. Fig. 3 shows modified forms of ribs. Fig. 4 shows another form of my invention. Fig. 5 shows a "honey-comb" or perforated form. Fig. 6 shows a ribbed or equivalent plate "corrugated." Fig. 7 shows a simple arrangement for charging the plates. Fig. 8 shows a compound arrangement for the same.

A typical form of plate, according to my invention, may be regarded as a plain plate provided with a series of parallel ribs attached thereto, as illustrated in end or edge section in Fig. 1. These ribs may extend across the plate, on one or both sides, in a vertical, or diagonal, or horizontal direction, as shown in Fig. 2, which is a side view of the plate, Fig. 1. One or many more similar ribs may cross and intersect the first series of ribs, as in Fig. 2, where three such are shown. These serve to strengthen the plate and prevent bending. I have shown the upper portion of the plate unprovided with ribs. This being the portion of the plate not immersed in the dilute acid or other liquid of the apparatus, ribs are here unnecessary. The edge ribs, however, or more, if desired, may extend to the top of the plate, as in Fig. 2, for the purpose of affording rigidity thereto. These or other strengthening-ribs may be made heavier than the remainder, which latter are provided, not so much for strength as for extension of surface.

It will be noticed in Fig. 1 that the ribs are not nearly so thick as the plate to which they are attached. By this arrangement a great economy of metal is effected, since the ribs, which afford the greater portion of the whole surface of the element, may be made so thin that in the process of forming or preparing the surfaces for action they may become oxidized nearly, or even quite, throughout, while the stability of the element or plate, as a whole, is maintained by the unaltered portion of the thicker plate to which the ribs are attached. On the other hand, with plates of extended surface formed by corrugation, the metal must everywhere be thick enough to leave a considerable portion unchanged after forming. Of course the ribs may be made as thick or thicker than the supporting-plate, if for any reason this becomes desirable. Such a form, with other modifications, is shown in Fig. 3.

In Fig. 3 I have shown ribs thicker at the edge where they join the supporting-plate than at the free edge. By this arrangement the ribs may become oxidized throughout at their thin edge, while the mass of oxide (or the subsequently reduced mass, in the case of the hydrogen plate of a battery) remains securely anchored to the supporting-plate by the remaining inclosed wedge-shaped rib.

Fig. 4 shows a modified form of ribbed plate or element in vertical end section, of which plate Fig. 2 may be regarded as a side view. Here the supporting-plate between the ribs is absent, the latter being supported by the side or end ribs, and by other transverse ribs, if necessary. This form of plate or element resembles an ordinary window-blind with the slats open. It may also be regarded as a thick plate perforated with a series of parallel slots.

Another form of plates or elements embodying my invention readily suggest themselves—such, for instance, as the honey-comb form, (indicated in Fig. 5,) which may resemble in construction a simple or double comb of beeswax.

The honey-comb form of plate may have its cells extending entirely through, and these may be regarded as a thick plate perforated to form the cells.

Figure 5:
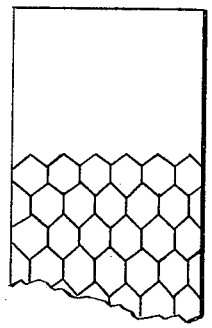
Figure 6:
Fig. 6 shows a ribbed or equivalent plate corrugated, whereby a further compactness of the element is secured. Comparatively thin plates, slotted or otherwise perforated, are well adapted for corrugation.
Figure 7:
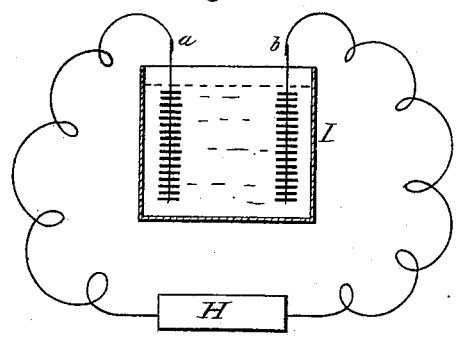
Figs. 7 and 8 are diagrams illustrating pairs of ribbed or equivalent plates arranged ready for charging, after having been "formed," or in any manner provided with an active coating.

In Fig. 7, $a$ $b$ are ribbed plates, immersed in dilute sulphuric acid, or other suitable liquid, contained in any suitable vessel I. The plates are connected respectively with the positive and negative poles of any suitable current-generator, H.

Figure 8:
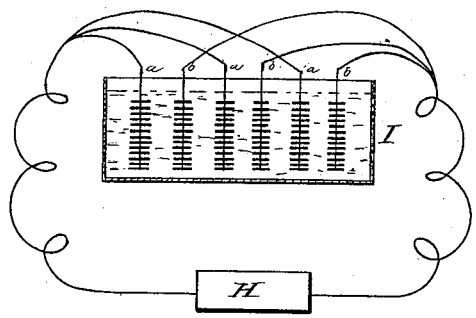

In Fig. 8 three pairs of plates $a$ $b$ are disposed alternately, all the plates $a$ being connected with one pole of the generator H and all the plates $b$ with the other pole. By this arrangement large surfaces may be accommodated within a small space and both sides of each plate, except the end ones, are exposed directly to action.

Secondary-battery plates or elements may be made according to my invention by pressing plain sheets or plates of lead or other suitable metal into suitable dies or forms by hydraulic or other means; also, by slotting, punching, or otherwise perforating suitable plates; also, by casting the melted metal into suitable molds. When the active coating on the surfaces of the plates is to be produced by a forming action on the metal itself cast plates are much more effective than those of rolled or pressed metal, since the forming or developing action thereon is much more rapid than on the more dense rolled or pressed metal.

Prominent among many advantages attending the use of secondary-battery plates or elements constructed according to my invention is the division of the total surface thereof into many small and comparatively independent areas, whereby the expansion or contraction of the active coating thereon is sufficiently accommodated, being evenly distributed to prevent the disintegration or peeling which is liable to occur on plain surfaces of considerable area.

Having fully described my invention, what I claim as new, and desire to secure by Letters Patent, is—

1. In a secondary battery, an element or electrode made up of a series of ribs, substantially as and for the purposes set forth.

2. In a secondary battery, a plate or element provided with outwardly-projecting ribs.

3. A secondary-battery element or electrode having its body support or frame provided with ribs.

4. In a secondary battery, the combination, with one cell thereof, of two or more ribbed plates or elements, substantially as set forth.

5. In a secondary battery, a plate, frame, or other sustaining-body provided with ribs or their equivalent, of less general thickness than the said plate or support, substantially as set forth.

6. In a secondary battery, a plate, frame, or other sustaining-body provided with ribs or their equivalents, said ribs or their equivalents being thicker at their bases than at their free edges or ends, substantially as set forth.

7. A secondary-battery element or electrode having its frame, support, or body provided with cells or cavities, the walls of said cells or cavities, or the septa between them, having an increasing thickness from their outer or free edges inward.

8. In a secondary battery, plates or elements provided with comparatively thin ribs, or their equivalents, for surface-exposure, and thicker ribs suitably disposed for supporting or stiffening purposes, substantially as set forth.

9. A secondary battery having a body frame or support of cast-lead.

10. A secondary-battery element consisting primarily of cast-lead.

11. A method or process of making a secondary-battery element, consisting in casting a suitable body, frame, or other support of lead and producing thereon an active or absorbing coating or substance.

12. A secondary-battery element or electrode having a supporting body or frame of cast-lead for the active coating or substance, said body or frame provided with ribs or projections.

13. A secondary-battery element or electrode having a supporting body or frame of cast-lead for the active coating or substance, said body or frame provided with cells, cavities, or depressions.

14. A secondary-battery element or electrode having a supporting body or frame of cast-lead for the active coating or substance, said body or frame provided with slots, perforations, or openings.

In testimony whereof I have signed my name to this specification in the presence of two subscribing witnesses.

CHARLES F. BRUSH.

Witnesses:
JNO. CROWELL, Jr.,
ALBERT E. LYNCH.